US010868911B1

(12) United States Patent
Portman et al.

(10) Patent No.: US 10,868,911 B1
(45) Date of Patent: *Dec. 15, 2020

(54) SYSTEM AND METHOD FOR AUTOMATICALLY VALIDATING AGENT IMPLEMENTATION OF TRAINING MATERIAL

(71) Applicant: Nice Ltd., Ra'anana (IL)

(72) Inventors: Leon Portman, Rishon Lezion (IL); Liron Stein, Ramat Hasharon (IL); Amram Amir Cohen, Tel Aviv (IL); Alexander Grushko, Pardes Hana (IL); Dror Eilan, Raanana (IL); Raanan Gonen, Beer Tuvia (IL); Naor Haimov, Tel Aviv (IL)

(73) Assignee: NICE LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,602

(22) Filed: Aug. 18, 2020

Related U.S. Application Data

(63) Continuation of application No. 16/855,106, filed on Apr. 22, 2020, which is a continuation of application No. 15/938,586, filed on Mar. 28, 2018, now Pat. No. 10,694,037.

(51) Int. Cl.
*H04M 3/00* (2006.01)
*H04M 3/51* (2006.01)
*H04M 3/523* (2006.01)

(52) U.S. Cl.
CPC ....... *H04M 3/5175* (2013.01); *H04M 3/5183* (2013.01); *H04M 3/5232* (2013.01); *H04M 2203/401* (2013.01); *H04M 2203/403* (2013.01)

(58) Field of Classification Search
CPC ......... H04M 3/5175; H04M 2203/401; H04M 3/42221
USPC ....................................... 379/265.06–265.07
See application file for complete search history.

(56) References Cited

U.S. PATENT DOCUMENTS

| | | | |
|---|---|---|---|
| 8,023,626 | B2 | 9/2011 | Moore, Jr. et al. |
| 8,068,598 | B1 | 11/2011 | Russi et al. |
| 8,226,477 | B1 | 7/2012 | Machado et al. |
| 8,571,463 | B2 | 10/2013 | Cohen et al. |
| 9,177,318 | B2 | 11/2015 | Shen et al. |
| 9,679,495 | B2 | 6/2017 | Cohen |
| 2009/0035736 | A1 | 2/2009 | Wolpert et al. |
| 2010/0028846 | A1 | 2/2010 | Cohen et al. |

(Continued)

FOREIGN PATENT DOCUMENTS

| WO | WO 2015/006246 | 1/2015 |
|---|---|---|
| WO | WO 2016/179403 | 11/2016 |

*Primary Examiner* — Rasha S Al Aubaidi
(74) *Attorney, Agent, or Firm* — Pearl Cohen Zedek Latzer Baratz LLP

(57) ABSTRACT

A system and method for testing an agent by a validation bot may include sending training material to an agent; automatically initiating, by the validation bot, a session with an agent by providing a phrase to the agent via a client media interface; obtaining a reply from the agent; mapping the reply of the agent to an agent intent; providing a response to the agent based on the agent intent and according to a predetermined session flow, wherein the predetermined session flow is based on the training material; repeating obtaining responses, mapping the responses and providing responses until a termination criterion is met; calculating a score of the agent according to scoring rules; and providing the score of the agent to a user.

20 Claims, 8 Drawing Sheets

(56) References Cited

U.S. PATENT DOCUMENTS

| | | |
|---|---|---|
| 2011/0008758 A1 | 1/2011 | Kortas et al. |
| 2014/0254776 A1 | 9/2014 | O'Connor et al. |
| 2014/0255895 A1 | 9/2014 | Shaffer et al. |
| 2015/0063556 A1 | 3/2015 | Uba et al. |
| 2016/0189558 A1 | 6/2016 | McGann et al. |
| 2016/0328986 A1 | 11/2016 | Corpus et al. |
| 2017/0018269 A1 | 1/2017 | Lev et al. |

SYSTEM AND METHOD FOR AUTOMATICALLY VALIDATING AGENT IMPLEMENTATION OF TRAINING MATERIAL

PRIOR APPLICATION DATA

The present application is a continuation of prior U.S. patent application Ser. No. 16/855,106 filed 22 Apr. 2020, and entitled "SYSTEM AND METHOD FOR AUTOMATICALLY VALIDATING AGENT IMPLEMENTATION OF TRAINING MATERIAL", which in turn is a continuation of prior U.S. patent application Ser. No. 15/938,586 filed Mar. 28, 2018, and entitled "SYSTEM AND METHOD FOR AUTOMATICALLY VALIDATING AGENT IMPLEMENTATION OF TRAINING MATERIAL", each of which being incorporated by reference in its entirety.

FIELD OF THE INVENTION

Embodiments of the invention relate to systems and methods for automatically validating comprehension and implementation of training material by agents at call centers. In particular, embodiments of the invention relate to automatically validating agents based on training material and agent actions.

BACKGROUND OF THE INVENTION

Company call centers or Internet-based support forums, also referred to herein as contact centers, put customers in contact with company agents (e.g. people working for the company providing customer service or other information to customers) for assistance. Agents' performance may be improved by increasing the agents' training. Agents may be trained for example, using coaching packages including training material which may be automatically distributed to agents, or in other manners. Typically, when a coaching package is launched or executed, agents are evaluated short time after the training material was sent to the agents, to test that the content of the coaching package is clear and after a predetermined time, e.g., after few weeks or months to see if the content is memorable. However, validating and testing that agents are adhering to the training material typically involves evaluating a real interaction with a real customer or with a human supervisor impersonating customer. This imposes a challenge on call centers operators, since in both cases highly trained supervisors are required for listening to calls with customers or for conducting validations sessions. The burden is significant also due to the need to constantly train new agents due to low job retention time.

SUMMARY

According to embodiments of the invention a system and method for testing an agent by a validation bot may include for example:
a. sending training material to an agent;
b. automatically initiating, by the validation bot, a session with an agent by providing a phrase to the agent via a client media interface;
c. obtaining a reply from the agent;
d. mapping the reply of the agent to an agent intent;
e. providing a response to the agent based on the agent intent and according to a predetermined session flow, wherein the predetermined session flow is based on the training material;
f. repeating operations c-e until a termination criterion is met;
g. calculating a score of the agent according to scoring rules; and
h. providing the score of the agent to a user.

According to embodiments of the invention the predetermined session flow may include possible agent intents, possible responses to the agent, scoring rules, response rules, and state variables, wherein a state of the validation bot may be updated based on the agent intent, and wherein providing the response to the agent may be performed based on the state of the validation bot and on the bot response rules.

Embodiments of the invention may include providing a confidence score for the intent.

Embodiments of the invention may include repeating operations a-h for a plurality of agents.

Embodiments of the invention may include determining timing of initiating sessions with agents that need to be validated based on a number of the agents that need to be validated and a time available for validating the agents, wherein timing may be determined so that the sessions are evenly distributed along the time available for validating the agents.

Embodiments of the invention may include scheduling the sessions for times in which there are more agents than an expected number required for answering human clients.

Embodiments of the invention may include scheduling the sessions for times in which a difference between an expected number of agent required for answering human clients and an actual number of agents is above a predetermined threshold.

According to embodiments of the invention the client media interface may be one of chat box, short message service (SMS), voice and any combination thereof.

Embodiments of the invention may include determining that the agent has passed a verification test if the score of the agent exceeds a predetermined threshold and determining that the agent has failed the verification test if the score does not exceed the threshold; and providing a pass/fail indication to the user.

Embodiments of the invention may include providing a recommendation to refine training material if a percentage of agents that have passed the verification test is below a predetermined threshold.

Embodiments of the invention may include, if the score is below a predetermined threshold, perform one of: sending training material to the agent, providing pop-ups with correct answers to the agent in real-time, and informing the agent of the low score.

According to embodiments of the invention, initiating the session may be done using queues of an automated call distribution (ACD) system.

According to embodiments of the invention a system and method for simulating a human client for testing agents may include for example:
a. initiating, by an automatic validation process, an interaction with an agent by providing a phrase to the agent;
b. receiving an agent reply from the agent;
c. correlating the agent reply with an agent intent using a natural language understanding engine;
d. updating a state of the validation process based on the agent intent;
e. providing a response to the agent based on the agent intent and on the state of the validation process;
f. repeating operations d-f until it is determined that the process should stop;

g. calculating a rating of the agent according to scoring rules; and h. providing the rating of the agent to a user.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
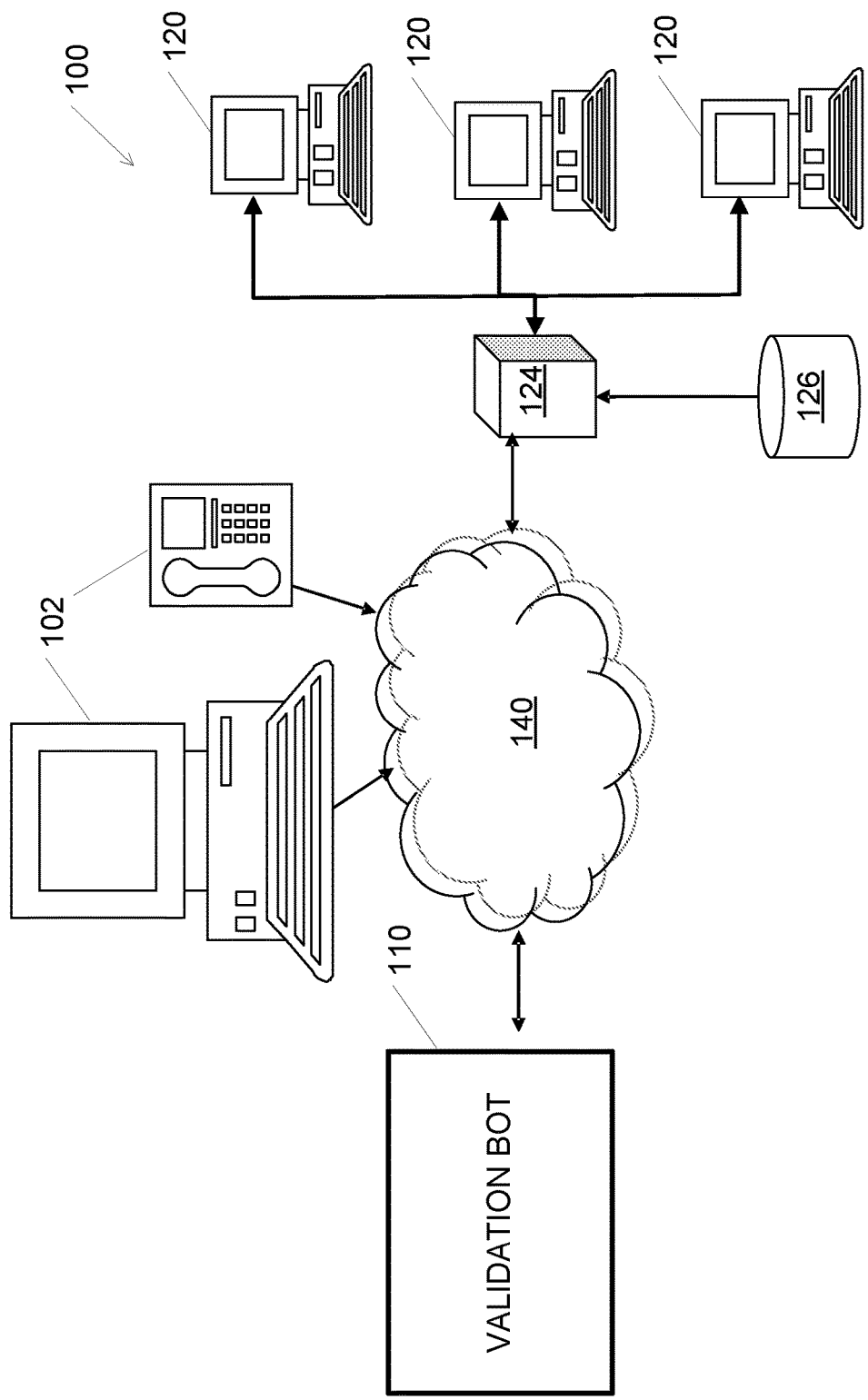
FIG. 1 schematically illustrates a system for automatically testing coaching effectiveness, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Customers may receive inconsistent service at telephone and Internet help centers due to the variation in agent competency and training. Also, guidelines for agents may be occasionally updated. To improve performance and keep agents updated, embodiments of the invention may automatically send training material to agents and test the coaching effectiveness at selected time periods, e.g., close to launching, to verify that the content of the training material is clear, or after few weeks or months to see if the content is memorable. Testing of the coaching effectiveness may be performed automatically by a validation bot. Training material may include documents, slideshows, audio or video recordings etc., that may include instructions, guidelines information and exercises that may be sent to an agent for training purposes. Current automatic training programs do not integrate training and automatic testing of the coaching effectiveness. Embodiments of the invention may automate the training and evaluating of agents. Embodiments of the invention may provide a score to each agent and may provide valuable input to a system operator regarding overall performance of agents. This input may be later used to improve coaching material. Additionally, embodiments of the invention may enable scheduling validation sessions in a way that may minimize the negative impact of validation sessions on agents' availability. This may be achieved by integrating scheduling of validations sessions with a workforce management program and scheduling sessions for hours in which the actual workforce is larger than a needed workforce, or by distributing validation calls evenly over the working hours.

Embodiments of the invention pertain to the technology of call centers and may provide an improvement to this technology by for example improving automated testing of agents and by improving automated testing and coaching effectiveness. In some embodiments training or coaching material may be automatically sent to agents according to a training program. A testing session with an improved validation bot according to embodiments of the invention may be automatically initiated thereafter to assess the coaching effectiveness. Embodiments of the invention may provide feedback to a user, e.g., the agent or a supervisor, regarding the performance of a single agent or a group of agents. Embodiments of the invention may improve the testing of agents by mapping the replies of the agent to an agent intent and providing a response based on the agent intent and a session flow, wherein the predetermined session flow is based on the training material.

Furthermore, embodiments of the invention may improve the technology behind the operation of call centers by scheduling bot validation sessions in hours in which the actual workforce is larger than a needed workforce. For example, this may be achieved by using information obtained from a workforce management program or application.

Embodiments of the invention may differ from a manual validation since the validation bot may employ a computerized language understanding engine for categorizing agent responses, thus enabling the validation bot to determine how to proceed in the validation session in accordance to the bot flow. Additionally, the automatic scheduling may be different from manual scheduling of sessions by offering integration with workforce management program.

Reference is made to FIG. 1, which schematically illustrates a system 100 for automatically testing coaching effectiveness, according to embodiments of the invention. System 100 may include support center 124 to connect user devices 102 or validation bot 110 to agent devices 120.

Contact center, also referred to as support center 124 may be or may include company call centers for telephone-based support or online support forums for Internet-based support, for example, to provide customers with technical support, sell products, schedule appointments, or otherwise interact or communicate with customers. Support center 124 may also be connected to validation bot 110. Support center 124 may include a switching station to order and connect each of a plurality of user devices 102 or validation bot 110 to one of a plurality of agent devices 120 at the same time. Support center 124 may order customers and validation bot 110 in a queue, for example, to be served on a first-come first-serve basis. Support center 124 may connect each customer's user devices 102 to the next available agent's device 120 from a pool of available agents, for example, to provide the fastest agent response time. Support center 124 may connect validation bot 110 to selected agents according to a schedule or testing program, as disclosed herein. Support center 124 may be connected to database 126 for storing training material, interactions between user devices 102 and agent's devices 120, and/or interactions between validation bot 110 and agent's devices 120, and any other relevant data.

Support center 124 may include or may be connected to a validation bot 110, which may send training material to agents and may coordinately test the coaching effectiveness by automatically initiating validation sessions, also referred to herein as validation interactions or calls, with the agents as disclosed herein. Validation bot 110, also referred to herein as validation process, may be a computer process that for the purpose of testing the coaching effectiveness, may act as or pretend to be a real customer, with which the agent is supposed to interact. Validation bot 110 and agent device 120 may be connected via one or more of a web connection, a telephone connection, a messaging connection and/or via one or more communication networks 140. Interactions or sessions between validation bot 110 and agent device 120 may use for example voice/voice over internet protocol (VoIP), chat, texting or messaging, micro-blogging, video, Internet, email and/or other communication channels.

System 100 may be connected, or configured to be connected, to one or more user devices 102, such as, computers (for web or Internet connections), telephones (for telephone or radio network connections), or messaging or text enabled devices (for messaging network connections), for a customer to interact with and communicate with agents over one or more networks 140. Customers may use user devices 102 to connect to live or automated agents, for example, using or operating on agent devices 120 at support center 124.

Figure 2:
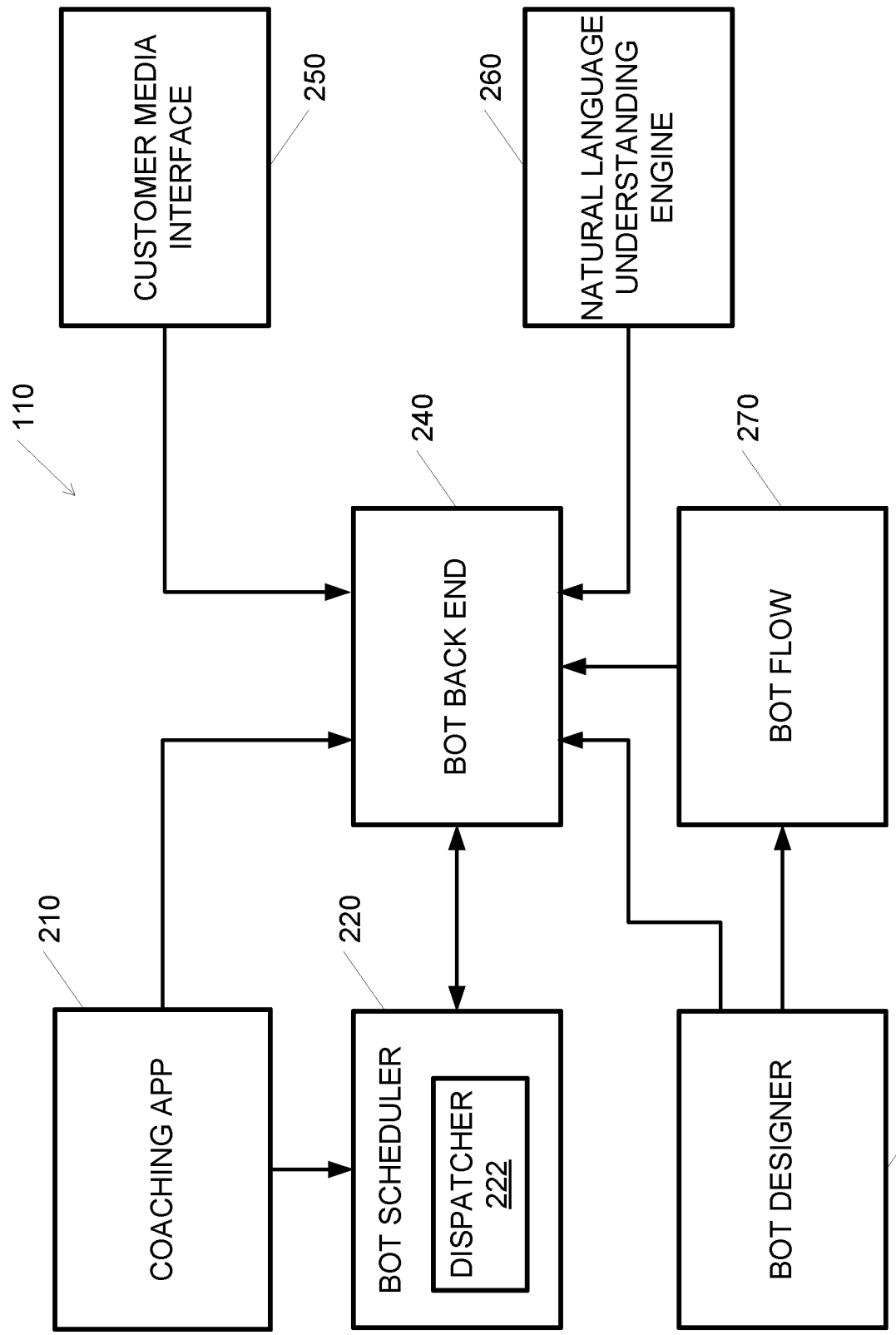
FIG. 2 schematically illustrates a top-level design of a validation bot, according to embodiments of the invention.
Figure 8:
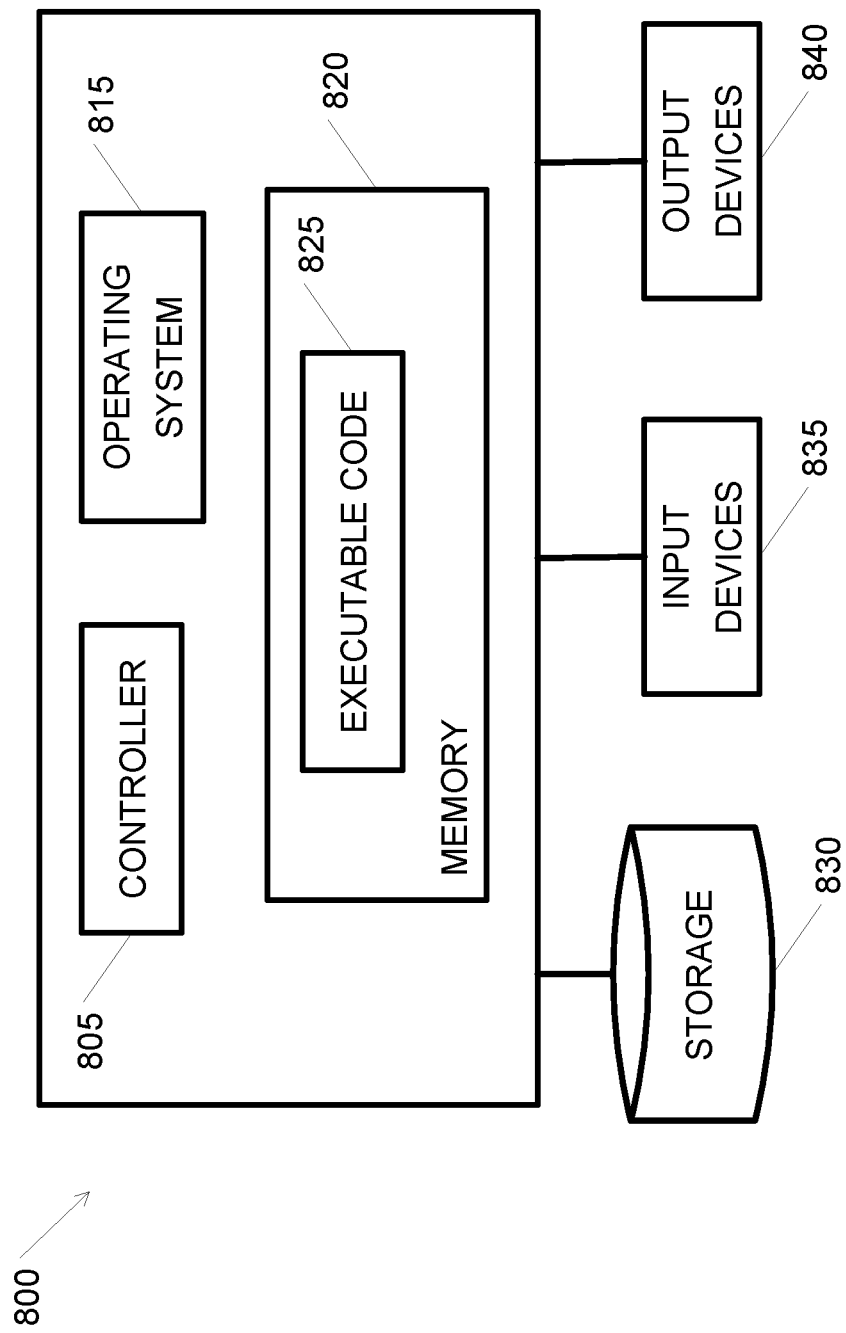
FIG. 8 is a high-level block diagram of an exemplary computing device according to some embodiments of the present invention.

Reference is made to FIG. 2, which schematically illustrates a top-level design of validation bot 110, according to embodiments of the invention. It should be readily understood that the structure of validation bot 110 depicted in FIG. 2 is demonstrative only and the functionality disclosed herein may be performed by other modules or structures. Validation bot 110 may include a coaching application 210, a bot scheduler 220, a bot designer 230, a validation bot backend application 240, a customer media interface 250 a natural language understanding engine 260 and bot flow 270. The various bot modules, and the bot itself, may be for example processes executed for example by a system as shown in FIG. 8.

Coaching application 210 may be configured to send coaching packages or training material to call center agents, e.g., via agent devices 120. Bot scheduler 220 may schedule validation sessions according to the coaching plan configuration and may include a dispatcher 222 that may trigger validation bot back end service 240 to start a session with a tested agent according to the schedule. The session may be for example a surprise session or a known session. For example, a coaching plan configuration may define when to send the coaching material to an agent or a group of agents, how much time should be given for the agents to learn the material, and when should validation bot back end service 240 be triggered to start validation sessions with the agents. In some embodiments bot scheduler 220 may obtain parameters such as for example training plan identifier and name, list of tested agents, validation bot identifier, bot passing score and validation bot start and end dates. Other parameters may be used. In order to minimize the effect of the validation calls on the calling center, it may be desirable to distribute validation sessions across time. Additionally, validation sessions may be distributed such that the availability of agents to real calls will not be affected, or be minimally affected. In some embodiments, bot scheduler 220 may be integrated or coordinated with a work force management (WFM) application, thus it may obtain information regarding agent availability and may schedule the initiation of validation sessions at times when agents are free. In some embodiments, there may be no integration with WFM application and bot scheduler 220 may not have information regarding agent availability. In this case, bot scheduler 220 may attempt to distribute validation sessions over time, so that not all or many agents will receive a validation session at the same time, which might decrease the capacity of many agents to serve customers at the same time. For example, bot scheduler 220 may attempt to distribute validation sessions as evenly as possible over time.

Bot designer application 230 may be an application configured to design, or to aid in the design of a validation bot or simulator based on the training material. Specifically, bot designer application 230 may be configured to design, or to aid in the design of bot flow 270. Bot designer application 230 may obtain the agent intents, bot response prompts or phrases, scoring rules, response rules, event rules and state variables as inputs and may generate bot flow 270 based on these inputs. The validation bot may include a predetermined session flow or flows, also referred to herein as bot flow 270, that is related to or based on the training material, e.g., the bot flow may be designed based on the training material in order to test that agents operate according to the training material. Bot flow 270 may include predefined agent intents, bot response prompts or phrases, scoring rules, response rules, event rules and state variables. As used herein a phrase may relate to or be an expression, e.g., a word or a group of words conveying a certain meaning. A bot response phrase or bot response may refer to a phrase that a validation bot may provide to the agent. As used herein, an intent may refer to an intention or a goal of the agent. Exemplary intents may include "greetings", "sell car insurance", etc. For example, phrases as "Do you also need car insurance?", "Can I offer you our car insurance policies?", "Would you be interested in adding car insurance?", may all be mapped to or categorized as the intent "sell car insurance", while phrases as: "Hello", "Hi", "Good morning", "How can I help you?" may be mapped to or categorized as the intent "greetings".

Bot response prompts may include sets of one or more response prompts or phrases that the bot may use to respond to an intent and a possibly to a state. For example, a set of prompts related to an "up sale car insurance" intent may include: "Yes", "What are your car insurance offerings?", "That could be interesting", etc. Thus, in response to an "up sale car insurance" intent, bot back end service 240 may select one phrase from the set. The actual prompt may be chosen randomly. In some embodiments, if a specific intent is expected to be provided by the agent more than once in a single session, then bot flow 270 may consider the current state in selecting a response from the relevant set. For example, a "Greetings" set of phrases for the "Greetings" intent may include a plurality of phrases, intended to provide a natural feel for the beginning of the interaction, but a "Greeting State" state variable may remember the greetings phrases that were used so the bot back end service 240 may not repeat itself and cause the interaction to progress beyond the greetings phase. For example, bot flow 270 may include a first "Greetings" set of phrases from which phrases may be randomly chosen with no repeat process, and after the first set is exhausted, a second "Greetings" set including more aggressive phrases may be used to advance the interaction. For example, the second set may include phrases such as: "I've called to renew my insurance, please could you provide an offer".

The bot state variables may include variables that may be used to define a state of bot back end service 240 in the interaction. The state variables may be used as memory for remembering past actions of bot back end service 240, for example, how many and which phrases were used before. For example, for the "Greetings" intent, bot flow 270 may include a first "Greeting" state variable that may define that bot back end service 240 may provide up to three phrases from a first "Greetings" set and a second "Greeting" state variable that may define that bot back end service 240 may provide up to two phrases from a second "Greetings" set. During an interaction, the first "Greeting" state variable may record or count the number of grating phrases provided by bot back end service 240, and may be used to advance bot back end service 240 to providing phrases from the second "Greetings" set if three phrases were provided from the first "Greetings" set and another "Greetings" was accepted from the agent. State variables may also be used for calculating the score or rating of the agent. It should be readily understood that other methods may be used for providing the functionality of the state variables.

The bot response rules may include rules that may define how to choose a response for a given intent and state. For example, a rule may be:
for a "Greeting" intent,
if the first "Greetings" set was used less than three times, then randomly chose a response from the first "Greetings" set and remove the chosen response from the first "Greetings" set, else
if the second "Greetings" set was used less than two times, then randomly chose a response from the second "Greetings" set and remove the chosen response from the second "Greetings" set, else
set a score variable to zero and chose a response from the "Failure" response set.

The bot scoring rules may include rules that may define the change to the interaction score according to an intent and state. For example, the "up sale car insurance" intent may increase the score by 10 points, but only in the first time it is recognized.

The event rules may include rules that may define a change to the state variables according to events. For example, if the agent doesn't respond to a specific input within 10 minutes in a session, the score may be reduced by 10 points.

The termination or exit rules may include rules that define if that a session should end or if exit criterion has occurred. The termination rules may also include a scoring formula that may be used for calculating the total interaction score or rating based, for example, on values of the state variables of the interaction. The termination rules may also and pass\fail rules that may define whether the interaction is successful or not. For example, a scoring formula may be the accumulated score of all the defined score variables and a pass\fail rule may be that if the accumulated score is above 70 the interaction is successful (e.g., pass) otherwise it is a failed test.

Validation bot backend application 240 may be responsible for orchestrating the flow of the bot conversation according to bot flow 270 and as scheduled by bot scheduler 220, and may include the logic that determines how the bot behaves.

Validation bot backend application 240 may receive a reply or answer from the agent. If the channel is voice, then the reply or inputs may be transcribed to text by an automatic speech recognition (ASR) engine. The reply may be interpreted by natural language understanding engine 260, that may map or categorize the agent reply or responses into intents. In some embodiments, natural language understanding engine 260 may include a classifier or other machine learning module that may be trained to classify phrases into intents. In some embodiments natural language understanding engine 260 may be or may include Microsoft's® language understanding intelligent service (LUIS)®. In some embodiments, natural language understanding engine 260 may return a list of possible intents and their corresponding probability scores, also referred to as confidence scores. The intent probability score may define or indicate the level in which natural language understanding engine 260 is confident that the phrase matches each intent. As part of the bot design possible intents and possible set of phrases that are mapped to those intents may be provided to natural language understanding engine 260. Natural language understanding engine 260 may use these intents and phrases to infer the intents from the phrases together with its own pre-trained language model. In some embodiments an "unidentified intent" may be defined, that may be returned in case the agent answer didn't fit any of the pre-defined intent.

Validation bot backend application 240 may obtain the intent, and based on the intent, may update a state of the validation bot, provide a response to the agent according to a predetermined session flow, and update a score of the agent according to scoring rules.

Validation bot backend application 240 may conduct a session with the coached agent via customer media interface 250. Customer media interface 250 may translate the response into the media channel of the session, e.g., chat box, SMS, voice or other channels. If the channel is voice then customer media interface 250 may use a voice synthesizer to generate human like voice from the text in the session flow.

Validation bot backend application 240 may obtain details of the tested agent, the channel and a session flow. The details of the tested agents may be obtained from an automated call distribution (ACD) system and may include a list of currently active agents, agent ID, channel type (e.g., voice call, chat, SMS etc.), ACD queues, etc. Validation bot backend application 240 may initiate the session with the tested agent using the relevant channel via customer media interface 250 by calling the agent, either by chat, SMS, by voice or by other media channels. Once the session is setup, validation bot backend application 240 may communicate with the agent according to the session flow via customer media interface 250. Upon receiving answers from the agent, a dialog of question-answer begins between validation bot 110 and the agent until the session or interaction is terminated. A session may be terminated by the agent, or by validation bot backend application 240. For example, validation bot backend application 240 may close the session if a termination criterion or conditions indicating the process should be stopped is met.

Figure 3:
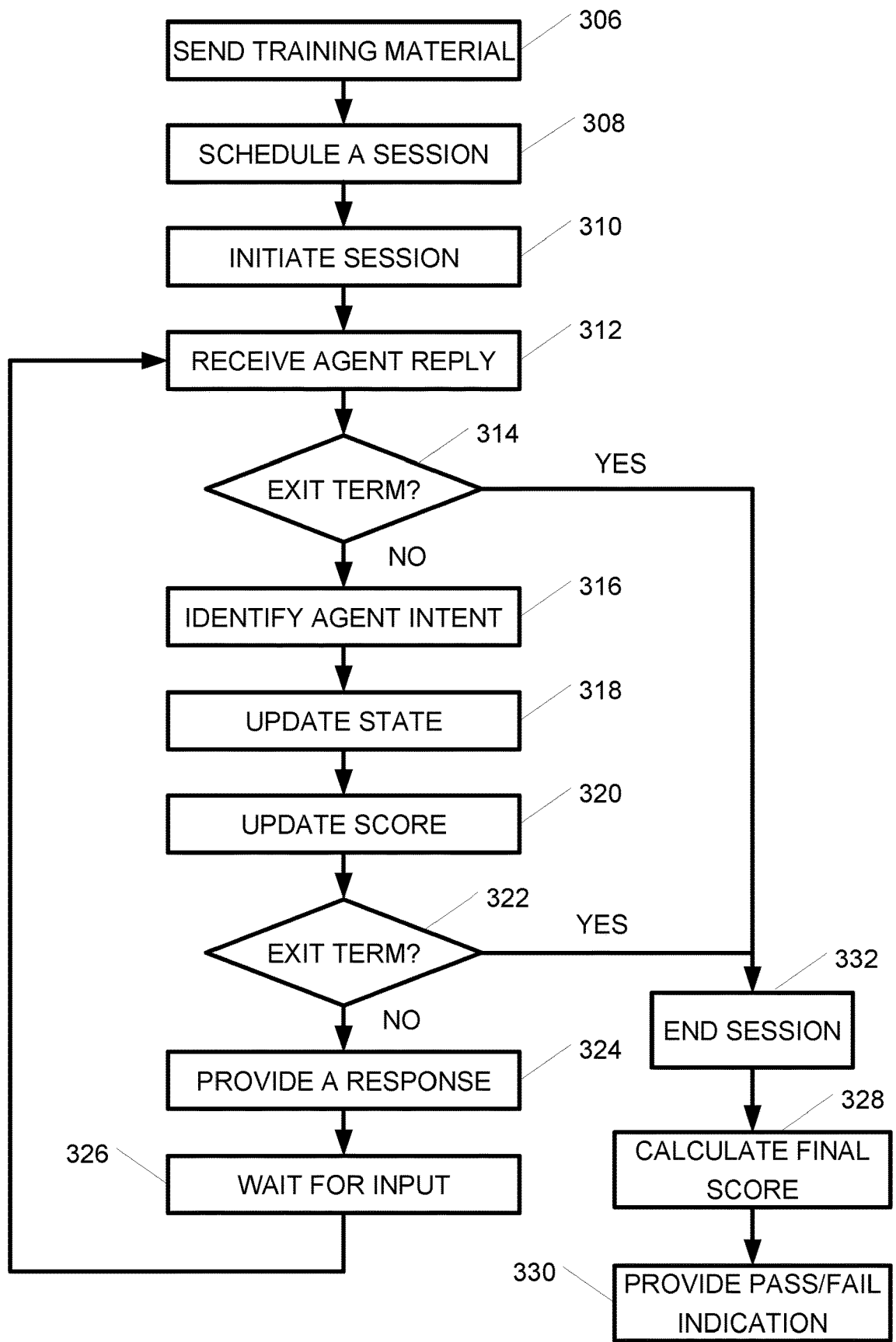
FIG. 3 is a high-level flowchart of a method for automatically testing coaching effectiveness by a validation bot, according to embodiments of the invention.

Reference is now made to FIG. 3 which is a high-level flowchart of a method for automatically testing coaching effectiveness by a validation bot, according to embodiments of the invention. In some embodiments, the method for testing an agent may be performed by validation bot 110 depicted in FIGS. 1 and 2. In operation 306 training material may be sent to one or more agents, e.g., by coaching application 210. In operation 308 a session with a selected agent may be scheduled, e.g., by bot scheduler 220. In operation 310 a session with a selected agent may be initiated, e.g., by dispatcher 222. The session may be for example a voice session or a written session over any applicable communication channel or standard, e.g., voice, voice over internet protocol (VoIP), chat, texting or messaging, micro-blogging, video, Internet, email and/or other communication channels. The session may be initiated by calling the agent and providing an opening phrase in accordance with bot flow 270. In operation 312 a reply may be received from the agent. In some embodiments, if no reply was received in a predefined timeout period, the flow might end, or the bot could initiate another response.

In operation 314 it may be checked whether a termination criterion is met or an exit term was reached. If a termination criterion is met, the flow may move to operation 332. Termination criterions, or reasons to stop the process may include, for example:

No reply was received in the defined timeout period.

Agent exceeds maximum allowed number of answers—bot flow 270 may have a limitation on the number of allowed agent answers in a single call. Exceeding this number may cause bot flow 270 to terminate the call.

Agent failed a critical question—bot flow 270 may include questions which may be defined as "critical questions", meaning that a failure by the agent to answer correctly these questions may lead bot flow 270 to mark the session as failure regardless of the agent answers in other questions.

If no termination criterion is met the flow may move to operation 316. In operation 316 the intent of the agent may be identified, by mapping, correlating or classifying the reply of the agent to an agent intent, e.g., using natural language understanding engine 260. In some embodiments, a list of possible intents and corresponding probability scores may be generated or calculated. In operation 318 the state of the validation bot may be updated based on the agent intent and on and rules defined by bot flow 270. The rules may include definitions as to how to choose which intent to use based on the confidence score of the intents. In operation 320, a ranking or score of the agent may be calculated or updated based on the agent intent and on scoring rules. For example, bot flow 270 may include a list of intents that are expected to be expressed by the agent during the interaction. If an expected intent is received from the agent, the score may be increased according to a predetermined formula. The formula for scoring may include weights for intents and other logic. In some embodiments, the score may be decreased if a number of replies was exceeded. For example, for every agent answer starting from the $10^{th}$ answer the score may be decreased by 5 points.

In operation 322 it may be checked whether a termination criterion that is based on the agent intent or updated score was met. For example, it may be checked in this point if the agent has failed to answer a "critical question", or whether the updated score is below a predetermined threshold. If no termination criterion was reached or met, then in operation 324 a response to the agent may be provided. The response may be selected based on the agent intent and according to a predetermined session flow. The response may be based on a state of validation bot 110. The response may be provided via customer media interface 250, in the appropriate communication channel and standard. If the intent is not identified, the bot may return some generic response or a request for clarifications.

Figure 4:
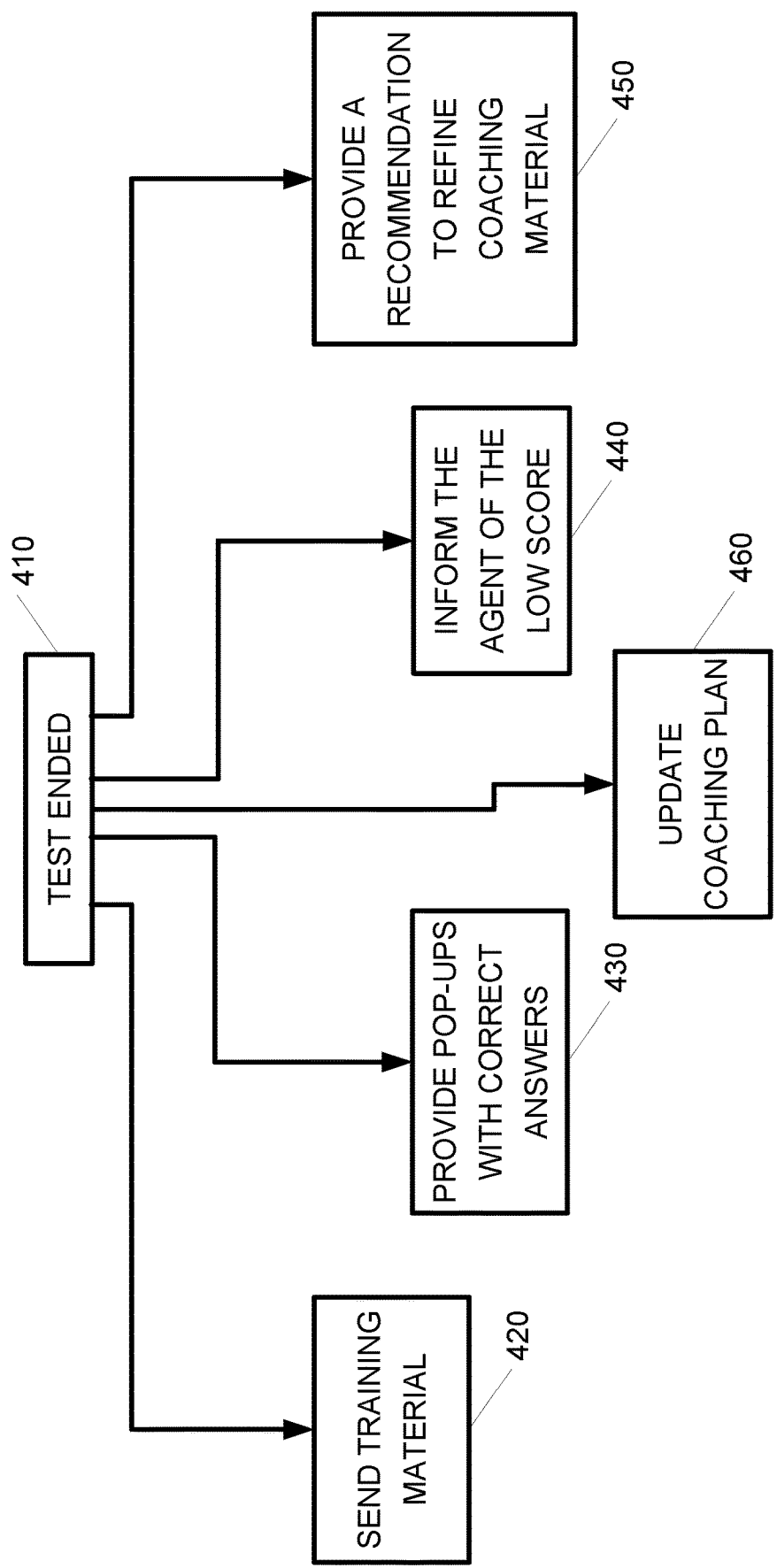
FIG. 4 is a high-level flowchart of the operations that may be performed in case of a failed test, according to embodiments of the invention.

Reference is now made to FIG. 4 which is a high-level flowchart of operations that may be performed in case of a failed test, according to embodiments of the invention. A failed test in a validation interaction may be where the agent has failed the verification test (e.g., as determined in operation 330 in FIG. 3). In some embodiments, these operations may be performed by validation bot 110 depicted in FIGS. 1 and 2. After a test has ended, as indicated in block 410, then one or more of the following may be performed automatically:

If an agent has failed the validation test, training material may be sent to the agent, as indicated in block 420. In some embodiments, the same training material that was sent in operation 306 may be resent again. In other embodiments other training material, e.g., more detailed training material, may be sent.

pop-ups, e.g., text provided on a screen of agent devices 120, with correct answers as may be defined in bot flow 270, may be provided to the agent in real-time, as indicated in block 430 this may be performed during the validation test as well as after the test has ended.

the agent may be informed of his score, as indicated in block 440.

If a large group of agents have failed, or if a percentage of agents that have passed the verification test is below a predetermined threshold, an indication that the training material should be refined or improved may be provided, as indicated in block 450. In some embodiments, validation bot 110 may provide a detailed report showing which questions were not answered properly by how many agents, thus providing a more specific insight as to what parts of the training material should be improved.

A coaching plan of a specific agent or a group of agents may be updated according to the validation test results, as indicated in block 460.

Figure 5:
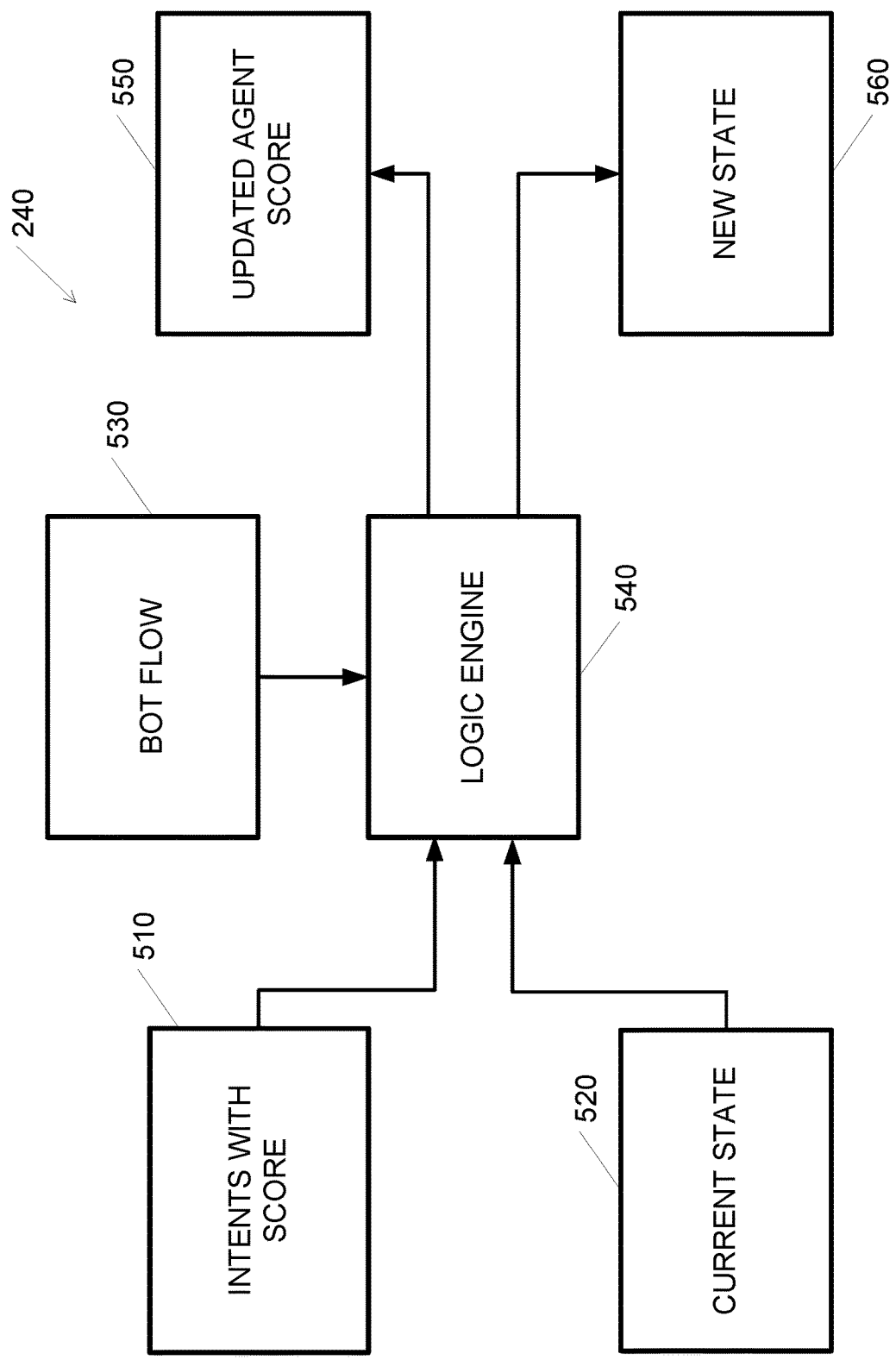
FIG. 5 schematically illustrates a partial operational flow of validation bot backend application, according to embodiments of the invention.

Reference is made to FIG. 5, which schematically illustrates a partial operational flow of validation bot backend application 240, according to embodiments of the invention. A logic engine 540 of validation bot backend application 240 may obtain intents with scores 510, e.g., from natural language understanding engine 260 and a current state 520, and may calculate a new state 560 based on intents with scores 510 and current state 520. New state 560 may be defined by updated values of the bot state variables and the bot response phrase that may be provided to the agent. Logic engine 540 may also calculate an updated agent score based on intents with scores 510 and current state 520.

The bot may also change its state according to the time it takes the agent to reply. For example, if the agent does not respond to a specific input within 10 minutes in chat, the score may be reduced by 10 points and the bot will tell the agent that it takes him too long to respond as a real customer might behave. In operation 326 the validation bot may wait for input or reply from the agent. Once a reply is received, the validation bot may return to operation 312.

Returning to FIG. 3, if a termination criterion is met, either in operation 314 or in operation 322, then the session terminates, ends or stops in operation 332 and in operation 328 a final score may be calculated, and in operation 330 a Boolean pass/fail indication may be provided. For example, it may be determined that the agent has passed the verification test if the score of the agent exceeds a predetermined threshold and that the agent has failed the verification test if the score does not exceed the threshold or if the agent failed a critical question. The score and the pass/fail indication may be provided to a user or to the initiator of the validation e.g., coaching application 210. The score and the pass/fail indication may be stored in a database, e.g., database 126. After providing the score and/or pass/fail indication the bot may end the session.

As indicated herein, it may be desirable to distribute validation sessions over time. If bot scheduler 220 is not integrated or coordinated with a WFM application then determining timing of initiating sessions with agents that need to be validated may be performed based on a number of the agents that need to be validated and a time available for validating the agents. Timing may be determined so that the sessions are evenly distributed over the time available for validating the agents. A very simple way to achieve that may be to divide the number of agents that need to be validated by the time available for validating the agents to arrive at a time interval, and initiating a session with an agent that needs to be validated every time interval. If the agent is not available, a session may be initiated with another agent that needs to be validated. Another method for evenly distributed sessions is given below.

Figure 6:
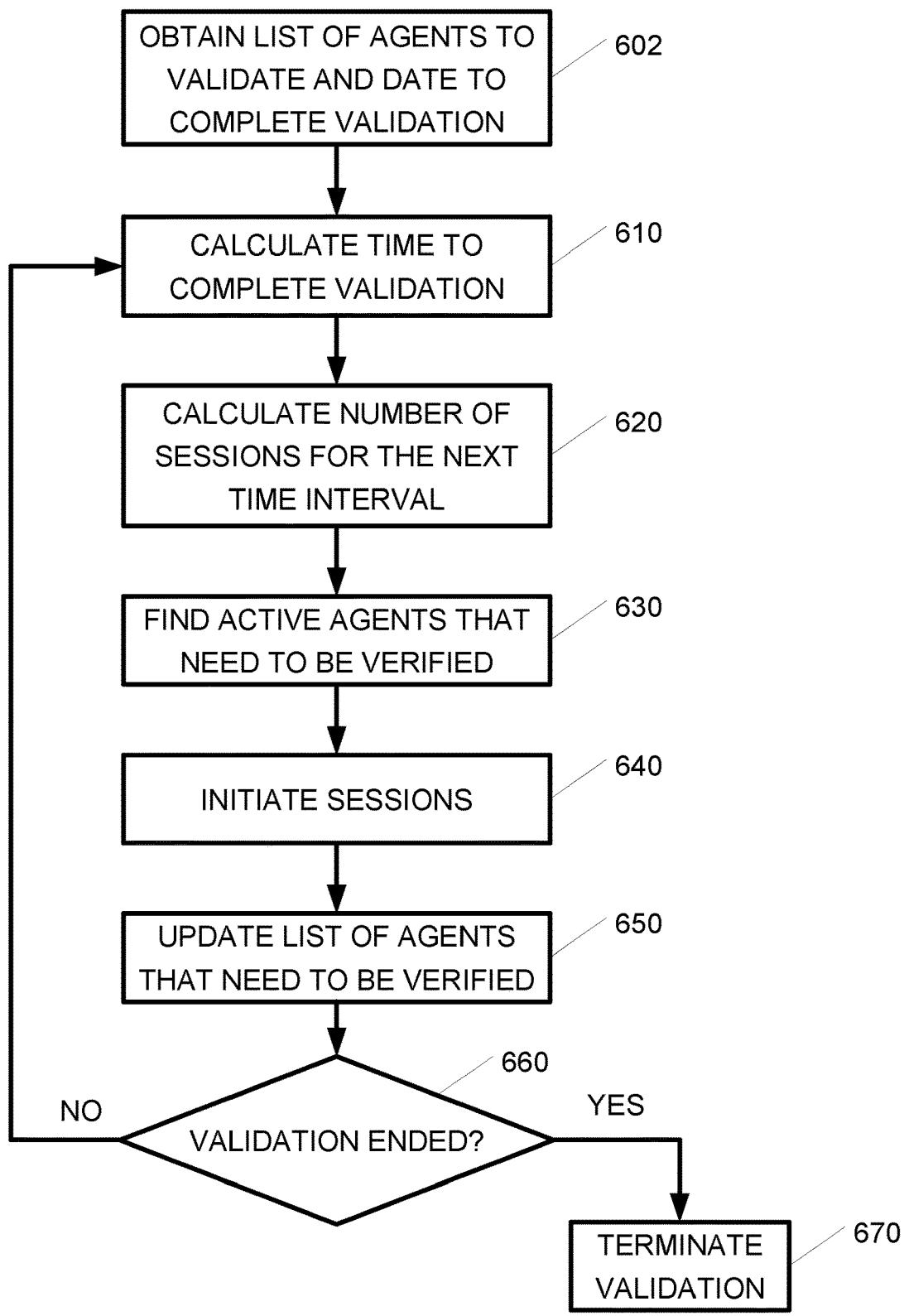
FIG. 6 is a high-level flowchart of a method for evenly distributing sessions, according to embodiments of the invention.

Reference is now made to FIG. 6 which is a high-level flowchart of a method for evenly distributing sessions, according to embodiments of the invention. In some embodiments, the method for evenly distributing sessions may be performed by bot scheduler 220 depicted in FIG. 2. According to some embodiments, scheduling of sessions for a relevant group of agents may be done over a period of time, and bot scheduler 220 may aim to spread the initiation of the sessions as evenly as possible over the time period. The motivation for evenly spreading verification sessions is to minimize the chances that many agents will receive a validation call at the same time and the availability of the call center, e.g., support center 124, may decrease. Embodiments of the method presented in FIG. 6 may be used when there is no information regarding agents shifts plan, staffing and expected loads, e.g., when there is no connection with a WFM application.

The following terminology may be used for describing the embodiment of FIG. 6:

total_agents_to_validate—list of agents that needs to receive a validation session.

agents_already_validated—list of agents for which a validation session was completed.

agents_not_yet_validated—list of agents for which a validation session was not yet launched.

date_to_complete_validation—the date by which all validation sessions need to be completed.

time_slots_to_complete_validation—how many time slots, e.g., working hours (or other time slot duration) remains before date_to_complete_validation date. This value may be calculated based on the difference between current time and date_to_complete_validation, taking into account working days and working hours in each day.

active_agents—list of agents who are currently active in the contact center.

In operation 602 the following parameters may be obtained: total_agents_to_validate, and date_to_complete_validation. In operation 610 the time available for completing the validation may be calculated, for example, time_slots_to_complete_validation parameter may be calculated based on current time and date_to_complete_validation parameter. Operation 610 may occur periodically, e.g., every predetermined time interval, while validation continues and during working hours, for example every hour. In operation 620 the number_of_sessions_to_dispatch_next_time_slot, e.g., the number of agents that should receive a validation session in coming time slot may be calculated, for example by dividing the number of agents_not_yet_validated by time_slots_to_complete_validation. For example, the number of agents that should receive validation bot session before the completion date may be divided by the number of time slots remaining until the end date. This calculation aims to evenly distribute validation sessions across working hours.

In operation 630 the active_agents list may be scanned to find agents that need to be verified, e.g., agents that are included in the agents_not_yet_validated list. In some embodiments the list may be obtained from the ACD system. In operations 640, sessions may be initiated with the agents that were found in operation 630, e.g., by dispatcher 222 depicted in FIG. 2. In case a session was initiated with the agent, then in operation 650 the agents_not_yet_validated list may be updated, e.g., the agent who received the validation session may be removed from the agents_not_yet_validated list and added to agents_already_validated list. In operation 660 it may be determined whether the validations have ended. The validation may end if all of the agents were validated, or when date_to_complete_validation has arrived. If by the end of the period (date=date_to_complete_validation) there are still agents who didn't receive the validation bot session (agents_not_yet_validated>0) then an alert may be provided to a user. The user may decide whether to extend the date_to_complete_validation or terminate the flow without all agents receiving validation bot sessions. If the validation has not ended then the flow may return to operation 610. If the validation has ended, then in operation 670 validation may be terminated. In some embodiments a list of agents_not_yet_validated, if any, may be provided to the user.

In some embodiments bot scheduler 220 may obtain information regarding agents shifts and staffing, e.g., by being integrated or coordinated with a WFM application. Thus, scheduling may be performed taking into account agents shifts and staffing. For example, sessions may be scheduled for times in which there are more agents than an expected number required for answering human clients. In some embodiments, sessions may be scheduled for times in which a difference between an expected number of agent required for answering human clients and an actual number of agents is above a predetermined threshold.

Figure 7:
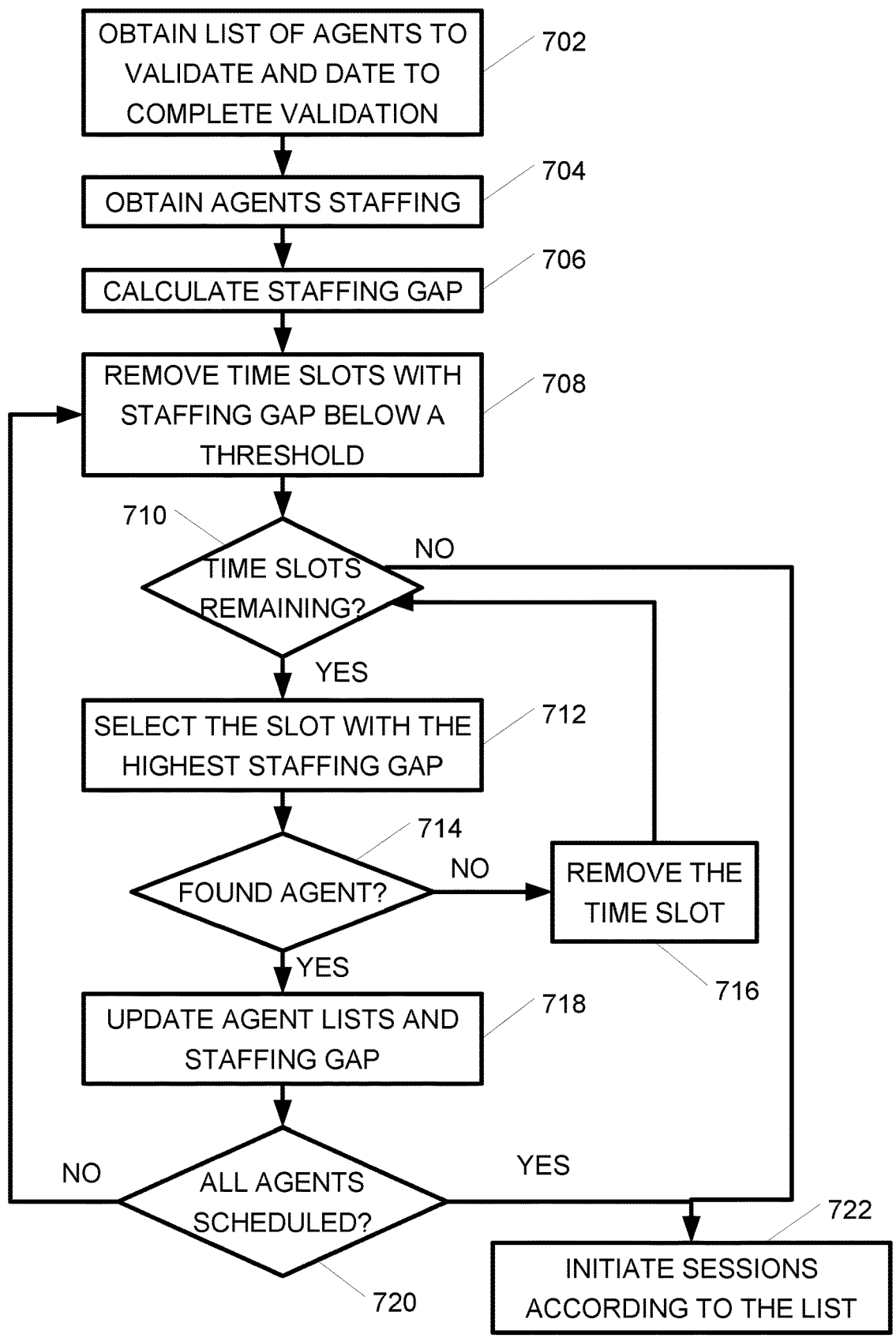
FIG. 7 is a high-level flowchart of a method for distributing sessions according to agent's availability, according to embodiments of the invention.

Reference is now made to FIG. 7 which is a high-level flowchart of a method for distributing sessions according to agent's availability, according to embodiments of the invention. In some embodiments, the method for distributing sessions according to agent's availability may be performed by bot scheduler 220 depicted in FIG. 2. In some embodiments, agent's availability may be obtained from a WFM application. Agent's availability information may include agent's shifts, e.g., which agents work at what times, staffing, e.g., how many agents are working per time, and an expected number of agents required for meeting the service level agreement (SLA, a commitment to answer a certain percentage of calls within a certain time) of the contact center. The expected number of agents required for meeting the contact center SLA may be referred to herein as the required number of agents. The required number of agents may be determined or estimated by a forecaster (not shown) at the contact center. Coordinating validation sessions with agent's availability may minimize the effect that validation sessions may have on the contact center, the effect is due to occupying the agents with bot training activity and not with answering customers. Embodiments of the invention may aim at minimizing the effect of the validation sessions by trying to find times in which the effect of reducing the available agents for answering validation calls will be minimal.

The following terminology may be used for describing the embodiment of FIG. 7:

- validation_end_date—the date by which all validation sessions need to be completed.
- Time slot—the time from the beginning of the validation to the validation_end_date may be divided into time slots, e.g., of half an hour, one hour, two hours or other duration.
- "over staffing" time slot—a time slot during contact center working hours in which there are more agents than the required number of agents.
- "under staffing" time slot—a time slot during contact center working hours in which there are less agents than required number of agents.
- agents_already_validated—list of agents for which a validation session was completed.
- agents_not_yet_validated—list of agents for which a validation session was not yet launched.
- staffing_threshold_for_bot_scehduling—a threshold on the difference between the actual number of agents and the required number of agents. For example, verification sessions may be scheduled for time slots in which the difference between the actual number of agents and the required number of agents is equal to or above the staffing_threshold_for_bot_scehduling. The staffing_threshold_for_bot_scehduling may have either positive or negative value. For example, if staffing_threshold_for_bot_scehduling equals three, then sessions may be initiated only when there is overstaffing of three agents or more, and If the staffing_threshold_for_bot_scehduling is set to −2 (minus two), then sessions may be initiated even when there is understaffing of two agents or less.
- agents_scheduled_for_bot—a list including details of the agents scheduled for a validation session, including, for example, the agent name, time of initiation and the specific bot flow to initiate.
- agents_not_scheduled_for_bot—list of agents for which the scheduler couldn't find any time slot under the algorithm constraints.
- The agents that are in the agents_scheduled_for_bot and agents_not_scheduled_for_bot together compose the list of agents in agents_not_yet_validated list.
- staffing_gap—the difference between the required number of agents and the actual number of agents at the contact center at a given time slot. A positive staffing_gap is equivalent to "overstaffing", and a negative staffing_gap is equivalent to "understaffing".

In operation 702 a list of all agents that needs to be validated, agents_not_scheduled_for_bot, may be obtained, e.g., from bot back end service 240. At this stage agents_scheduled_for_bot list may be empty. In operation 704 agent's shift plan and staffing of the contact center from current date until validation_end_date, as well as the required number of agents at each time slot, may be obtained, e.g., from a WFM application. In operation 706 a staffing_gap may be calculated for each time slot as the difference between the required number of agents and the actual staffing at each time slot. In operation 708, all time slots with staffing_gap that is lower than the staffing_threshold_for_bot_scehduling may be removed. In operation 710 it may be verified if there are relevant time slots remaining, e.g., if there are still available time slots with staffing_gap that is equal to or higher than the staffing_threshold_for_bot_scehduling.

In operation 712 the time slot with the highest staffing_gap may be selected. For example, the remaining time slots may be sorted in descending order (the time slot with highest staffing_gap may be first) and the first time slot may be selected. The sorted time slots may be stored in an ordered list called "ordered_time_slot". In operation 714, it may be determined if agent is in the agents_not_scheduled_for_bot list are scheduled to work at the contact center during the selected time slot, e.g., based on the agent's shifts plan. If no agents are scheduled to work at the contact center during the selected time slot, then in operation 716 the time slot may be removed from consideration since not agents that need to be verified are working at the call center during this time slot, and the flow may return to operation 710. If in operation 714, an agent from the agents_not_scheduled_for_bot list is found to be scheduled to work at the contact center during the selected time slot, then in operation 718 the agent may be removed from the agents_not_scheduled_for_bot list, and added to the agents_scheduled_for_bot list, with the current time slot as an associated "launch time" parameter. Also in operation 718, the staffing_gap of the selected time slot may be decreased by one, since an agent was allocated to receive a verification session in this time slot, effectively reducing the number of agents available for handling customers by 1.

In operation 720, it may be verified whether agents_not_scheduled_for_bot list is empty, e.g., whether all agents that were originally in that list were scheduled for a verification session. If there are agents remaining in the agents_not_scheduled_for_bot list, then the flow may return to operation 708, to remove time slots with staffing_gap below the staffing_threshold_for_bot_scehduling, e.g., the time slot selected in operation 712 may be removed if after allocating a verification session to an agent in this time slot, the staffing_gap of that time slot has decreased below the staffing_threshold_for_bot_scehduling.

If it is determined in operation 720 that the agents_not_scheduled_for_bot list is empty, or if there are no time slots with staffing_gap equal or above the staffing_threshold_for_bot_scehduling then scheduling is complete, the agents_scheduled_for_bot and agents_not_scheduled_for_bot lists are populated correctly, and the flow moves to operation 722. In some embodiments, operations 702-720 may be repeated periodically, or if a change in the agent's availability information has occurred.

In operation 722 validation sessions may be initiated according to the agents_scheduled_for_bot list. For example, the list of agents_scheduled_for_bot may be scanned periodically, e.g., every minute, every 10 minutes etc., to see whether a "launch time" parameter of sessions in the agents_scheduled_for_bot list has arrived, e.g., if the current time is higher than the "launch time" specified in the agents_scheduled_for_bot list. Operation 722 may be performed by a dispatcher block 222 depicted in FIG. 2. If a session is initiated and performed, the agent may be removed from the agents_scheduled_for_bot list and is moved to the agents_already_validated list. In case of failure in initiating the validation session, the agent may be removed from the agents_scheduled_for_bot list and moved to the agents_not_scheduled_for_bot. In this case operations 702-720 may be repeated to allocate a new time slot for a new validation bot session for the agent. A coaching service or a user may be updated with all agents in the agents_not_scheduled_for_bot list.

Reference is made to FIG. 8, showing a high-level block diagram of an exemplary computing device according to some embodiments of the present invention. Computing device 800 may include a controller 805 that may be, for example, a central processing unit processor (CPU), a graphics processing unit (GPU), a chip or any suitable computing or computational device, an operating system 815, a memory 820, executable code 825, storage or storage device 830, input devices 835 and output devices 840. Controller 805 may be configured to carry out methods described herein, and/or to execute or act as the various modules, units, etc., for example by executing code or software. More than one computing device 800 may be included. For example, by executing executable code 825 stored in memory 820, controller 805 may be configured to carry out a method for testing agents by a validation bot as described herein. Each of user devices 102, support center 124 validation bot 110 and agent devices 120 may be or may include computing device 800 or components similar to device 800. Processes such as a validation bot 110 may be executed by a device similar to device 800.

Operating system 815 may be or may include any code segment (e.g., one similar to executable code 825 described herein) designed and/or configured to perform tasks involving coordination, scheduling, arbitration, supervising, controlling or otherwise managing operation of computing device 800, for example, scheduling execution of software programs or enabling software programs or other modules or units to communicate. Operating system 815 may be a commercial operating system.

Memory 820 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 820 may be or may include a plurality of, possibly different memory units. Memory 820 may be a computer or processor non-transitory readable medium, or a computer non-transitory storage medium, e.g., a RAM.

Executable code 825 may be any executable code, e.g., an application, a program, a process, task or script. Executable code 825 may be executed by controller 805 possibly under control of operating system 815. For example, executable code 825 may be an application that when executed generates pseudo-realistic data as further described herein. Although, for the sake of clarity, a single item of executable code 825 is shown in FIG. 8, a system according to embodiments of the invention may include a plurality of executable code segments similar to executable code 825 that may be loaded into memory 820 and cause controller 805 to carry out methods described herein. For example, units or modules described herein may be, or may include, controller 805 and executable code 825.

Storage device 830 may be any applicable storage system, e.g., a disk or a virtual disk used by a VM. Storage 830 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 830 and may be loaded from storage 830 into memory 820 where it may be processed by controller 805. In some embodiments, storage device 830 may be used for storing data related to generating pseudo-realistic data. In some embodiments, some of the components shown in FIG. 8 may be omitted. For example, memory 820 may be a non-volatile memory having the storage capacity of storage 830. Accordingly, although shown as a separate component, storage 830 may be embedded or included in memory 820. Database 126 may be implemented over storage 830.

Input devices 835 may be or may include a mouse, a keyboard, a touch screen or pad or any suitable input device. It will be recognized that any suitable number of input devices may be operatively connected to computing device 800 as shown by block 835. Output devices 840 may include one or more displays or monitors, speakers and/or any other suitable output devices. It will be recognized that any suitable number of output devices may be operatively connected to computing device 800 as shown by block 840. Any applicable input/output (I/O) devices may be connected to computing device 800 as shown by input devices 835 and output devices 840. For example, a wired or wireless network interface card (NIC), a printer, a universal serial bus (USB) device or external hard drive may be included in input devices 835 and/or output devices 840.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 820, computer-executable instructions such as executable code 825 and a controller such as controller 805.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 820 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 805), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 800.

Different embodiments are disclosed herein. Features of certain embodiments may be combined with features of other embodiments; thus, certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus, certain embodiments may be combinations of features of multiple embodiments.

What is claimed is:

1. A computer implemented method for testing an agent by a validation bot executed by a processor, the method comprising:
   a. sending training material, by the validation bot, to an agent;
   b. at the same time that agents other than the agent are connected to customers, automatically initiating, by the validation bot, a session with an agent by providing a natural language phrase to the agent via a client media interface, wherein the client media interface is the same interface the agent uses to communicate with a customer, wherein, during the session, the validation bot pretends to be a real customer with which the agent is supposed to interact;
   c. obtaining, by the validation bot, a reply from the agent;
   d. interpreting the reply by a natural language engine which includes a machine learning module trained to classify agent replies into agent intents and mapping, by the validation bot, the reply of the agent to an agent intent, wherein the agent intent is a goal of the agent expressed by the agent during the session; and
   e. providing, by the validation bot, a response to the agent based on the mapped agent intent.

2. The method of claim 1, wherein the providing of the response is according to the mapped agent intent and on a predetermined session flow, wherein the predetermined session flow is based on the training material, wherein the response is translated into a media channel of the session, and wherein the predetermined session flow comprises possible agent intents, possible responses to the agent, scoring rules, response rules, and state variables, wherein a state of the validation bot is updated based on the agent intent, and wherein providing the response to the agent is performed based on the state of the validation bot and on the bot response rules.

3. The method of claim 1, comprising calculating, by the validation bot, a score of the agent according to scoring rules.

4. The method of claim 3, comprising providing a recommendation to refine training material if a percentage of agents that have passed a verification test based on the score of the agent is below a predetermined threshold.

5. The method of claim 1, comprising repeating operations a-e for a plurality of agents.

6. The method of claim 5, comprising:
   determining timing of initiating sessions with agents that need to be validated based on a number of the agents that need to be validated and a time available for validating the agents, wherein timing is determined so that the sessions are evenly distributed along the time available for validating the agents.

7. The method of claim 1, comprising scheduling the sessions for times in which there are more agents than an expected number required for answering human clients.

8. The method of claim 1, comprising scheduling the sessions for times in which a difference between an expected number of agents required for answering human clients and an actual number of agents is above a predetermined threshold.

9. The computer implemented method of claim 1 wherein the client media interface is a chat box, a short message service (SMS), voice, or any combination thereof.

10. The method of claim 1 comprising repeating, by the validation bot, operations c-e until a termination criterion is met.

11. A computer implemented method for simulating a human client for testing agents, the method comprising:
    a. initiating, by an automatic validation process executed by a processor a session with the agent by providing a natural language phrase to the agent via a client media interface, wherein the client media interface is the same interface the agent uses to communicate with a customer, the initiating occurring at the same time that agents other than the agent are connected to customers, wherein, during the session, the processor pretends to be a real customer with which the agent is supposed to interact;
    b. receiving an agent reply from the agent, wherein the agent intent is a goal of the agent expressed by the agent during the interaction;
    c. correlating the agent reply with an agent intent using a natural language understanding engine which includes a machine learning module trained to classify agent replies into agent intents;
    d. updating a state of the validation process based on the agent intent;
    e. providing a response to the agent based on the agent intent;
    f. calculating a rating of the agent according to scoring rules; and
    g. providing the rating of the agent to a user.

12. The method of claim 11, comprising providing a response to the agent based on the agent intent and on the state of the validation process, wherein the response is translated into a media channel of the interaction.

13. A system for testing an agent by a validation bot, the system comprising:
    a memory;
    a processor configured to:
    a. send training material to an agent;
    b. automatically initiate a session in which the validation bot pretends to be a real human customer interacting with an agent, at the same time that agents other than the agent are connected to customers, by providing a phrase to the agent via a client media interface, wherein the client media interface is the same interface the agent uses to communicate with a customer;
    c. obtain a reply from the agent;
    d. interpret the reply by a natural language engine which includes a machine learning module trained to classify agent replies into agent intents and map the reply of the agent to an agent intent, wherein the agent intent is a goal of the agent expressed by the agent during the session; and e. provide a response to the agent based on the agent intent.

14. The system of claim 13, comprising providing the response based on the agent intent and according to a predetermined session flow, wherein the predetermined session flow is based on the training material, wherein the response is translated into a media channel of the session, and wherein the predetermined session flow comprises possible agent intents, possible responses to the agent, scoring rules, response rules, and state variables, wherein a state of the validation bot is updated based on the agent intent, and wherein providing the response to the agent is performed based on the state of the validation bot and on the bot response rules.

15. The system of claim 13, comprising repeating operations a-e for a plurality of agents.

16. The system of claim 13, wherein the processor is configured to determine timing of initiating sessions with agents that need to be validated based on a number of the agents that need to be validated and a time available for validating the agents, wherein timing is determined so that the sessions are evenly distributed along the time available for validating the agents.

17. The system of claim 13, wherein the processor is configured to schedule the sessions for times in which there are more agents than an expected number required for answering human clients.

18. The system of claim 13, wherein the processor is configured to schedule the sessions for times in which a difference between an expected number of agent required for answering human clients and an actual number of agents is above a predetermined threshold.

19. The system of claim 13, wherein the processor is configured to calculate, by the validation bot, a score of the agent according to scoring rules.

20. The system of claim 19, comprising if the score is below a predetermined threshold performing one of: sending training material to the agent, providing pop-ups with correct answers to the agent in real-time, and informing the agent of the low score.

* * * * *